(12) United States Patent
Xu et al.

(10) Patent No.: US 11,262,531 B2
(45) Date of Patent: Mar. 1, 2022

(54) CAMERA OPTICAL LENS

(71) Applicant: AAC Optics Solutions Pte. Ltd., Singapore (SG)

(72) Inventors: Minyi Xu, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 202 days.

(21) Appl. No.: 16/676,435

(22) Filed: Nov. 7, 2019

(65) Prior Publication Data
US 2020/0409039 A1 Dec. 31, 2020

(30) Foreign Application Priority Data
Jun. 30, 2019 (CN) .......................... 201910581715.3

(51) Int. Cl.
*G02B 9/62* (2006.01)
*H04N 5/225* (2006.01)
*G02B 27/00* (2006.01)
*G02B 15/14* (2006.01)
*G02B 13/00* (2006.01)

(52) U.S. Cl.
CPC .......... *G02B 9/62* (2013.01); *G02B 13/0045* (2013.01); *G02B 15/1461* (2019.08); *H04N 5/2254* (2013.01); *G02B 27/0012* (2013.01)

(58) Field of Classification Search
CPC .... G02B 13/0045; G02B 13/18; G02B 13/04; G02B 13/06; G02B 9/62; G02B 9/64; G02B 3/04; G02B 15/1461; G02B 27/0012; H04N 5/2254
USPC ................ 359/658, 413, 756, 757, 759, 760
See application file for complete search history.

(56) References Cited

U.S. PATENT DOCUMENTS

2014/0293458 A1* 10/2014 Nabeta ............... G02B 13/0045
359/759
2015/0015765 A1* 1/2015 Lee .................... G02B 13/0045
348/335

FOREIGN PATENT DOCUMENTS

| JP | 1986138225 A1 | 6/1986 |
| JP | 1996086957 A1 | 4/1996 |
| JP | 2003302577 A1 | 10/2003 |
| JP | 2019079003 A1 | 5/2019 |

OTHER PUBLICATIONS

1st Office Action dated Jan. 27, 2020 by JPO in related Japanese Patent Application No. 2019149250 (5 Pages).

* cited by examiner

*Primary Examiner* — Travis S Fissel
(74) *Attorney, Agent, or Firm* — W&G Law Group

(57) ABSTRACT

The present disclosure relates to an optical lens, in particular to a camera optical lens. The camera optical lens includes, from an object side to an image side in sequence: a first lens, a second lens, a third lens, a fourth lens, a fifth lens and a sixth lens, the first lens has a positive refractive power, the second lens has a positive refractive power, and the third lens has a negative refractive power, and the camera optical lens satisfies the following conditions: $-20.00 \leq f2/f3 \leq -10.00$, and $0.50 \leq d1/d3 \leq 3.00$, where f2 denotes a focal length of the second lens, f3 denotes a focal length of the third lens, d1 denotes an on-axis thickness of the first lens, and d3 denotes an on-axis thickness of the second lens. The camera optical lens can obtain high imaging performance and a low TTL.

19 Claims, 7 Drawing Sheets

Field curvature | Distortion

CAMERA OPTICAL LENS

TECHNICAL FIELD

The present disclosure relates to an optical lens, in particular to a camera optical lens suitable for handheld devices such as smart phones or digital cameras, and camera devices such as monitors or PC lenses.

BACKGROUND

With an emergence of smart phones in recent years, a demand for miniature camera lens is gradually increasing, and a photosensitive device of a general camera lens is no other than a charge coupled device (CCD) or a complementary metal-oxide semiconductor (CMOS) sensor. Since a progress of a semiconductor manufacturing technology makes a pixel size of the photosensitive device smaller, a current development trend of electronic products is that their functions should be better and their shape should be thinner and smaller, the miniature camera lens with good imaging quality has become a mainstream in the market. In order to obtain better imaging quality, the lens that is traditionally equipped in a mobile phone camera adopts a three-piece or a four-piece lens structure. Besides, with a development of technologies and an increase of diverse demands of users, and under a circumstance that a pixel area of the photosensitive device is shrinking and a requirement of the system for the imaging quality is improving constantly, a five-piece, a six-piece and a seven-piece lens structure gradually appear in a lens design. There is an urgent need for ultra-thin wide-angle camera lenses which have good optical characteristics and fully corrected chromatic aberration.

DETAILED DESCRIPTION OF THE EXEMPLARY EMBODIMENTS

To make objectives, technical solutions, and advantages of the present disclosure clearer, embodiments of the present disclosure are described in detail with reference to accompanying drawings in the following. A person of ordinary skill in the art can understand that, many technical details in the embodiments of the present disclosure are provided to make readers better understand the present disclosure. However, even without these technical details and any changes and modifications based on the following embodiments, technical solutions required to be protected by the present disclosure can be implemented.

Embodiment 1

Figure 1:
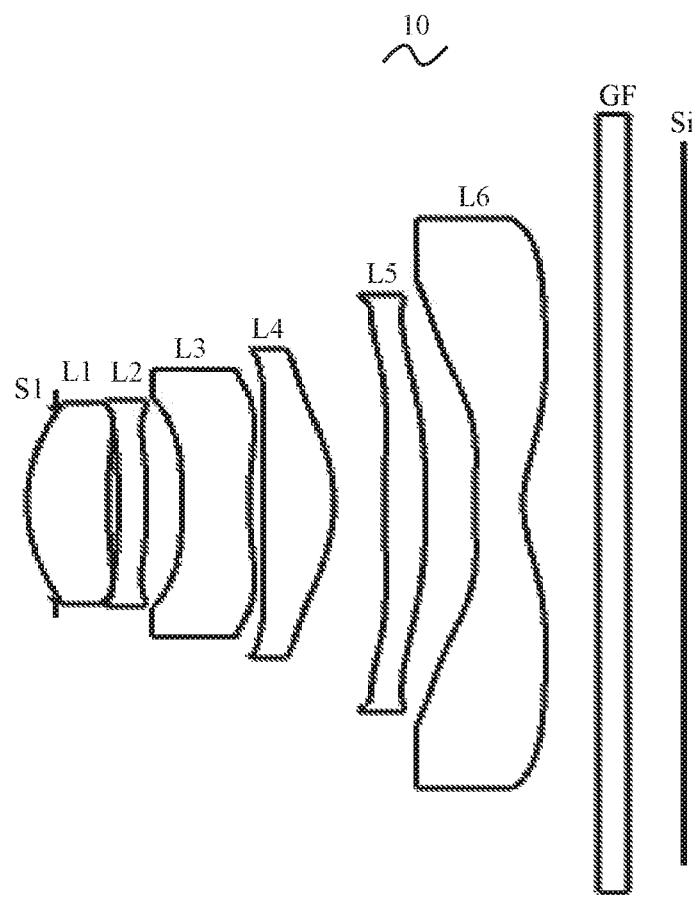
FIG. 1 is a schematic diagram of a structure of a camera optical lens in accordance with Embodiment 1 of the present disclosure.

Referring to the accompanying drawings, the present disclosure provides a camera optical lens 10. FIG. 1 shows the camera optical lens 10 in Embodiment 1 of the present disclosure, and the camera optical lens 10 includes six lenses. Specifically, the camera optical lens 10 includes from an object side to an image side in sequence: an aperture S1, a first lens L1, a second lens L2, a third lens L3, a fourth lens L4, a fifth lens L5 and a sixth lens L6. An optical element such as an optical filter GF can be arranged between the sixth lens L6 and an image surface S1.

The first lens L1, the second lens L2, the third lens L3, the fourth lens L4, the fifth lens L5, and the sixth lens L6 are made of plastic materials.

Herein, a focal length of the second lens L2 is defined as f2, a focal length of the third lens L3 is defined as f3. The camera optical lens 10 satisfies the following condition: $-20.00 \leq f2/f3 \leq -10.00$, which specifies a ratio of the focal length f2 of the second lens L2 and the focal length f3 of the third lens L3, to effectively reduce sensitivity of the camera optical lens 10 for imaging and further improve imaging quality. Preferably, the camera optical lens 10 satisfies the following condition: $-19.92 \leq f2/f3 \leq -10.00$.

An on-axis thickness of the first lens L1 is defined as d1, an on-axis thickness of the second lens L2 is defined as d3. The camera optical lens 10 satisfies the following condition: $0.50 \leq d1/d3 \leq 3.00$, which specifies a ratio of an on-axis thickness of the first lens L1 and an on-axis thickness of the second lens L2. When the value is within this range, it is beneficial for a development towards ultra-thin and wide-angle lenses. Preferably, the camera optical lens 10 satisfies the following condition: $0.51 \leq d1/d3 \leq 2.95$.

A total optical length from an object-side surface of the first lens L1 to the image surface S1 of the camera optical lens along an optical axis is defined as TTL.

In the present disclosure, when the focal length f2 of the second lens L2, the focal length f3 of the third lens L3, the on-axis thickness d1 of the first lens L1, and the on-axis thickness d3 of the second lens L2 satisfy the above conditions, the camera optical lens 10 has an advantage of high performance and satisfies a design requirement for a low TTL.

In this embodiment, an object-side surface of the first lens L1 is convex in a paraxial region, an image-side surface of the first lens L1 is concave in the paraxial region, and the first lens L1 has a positive refractive power.

Herein, a focal length of the camera optical lens 10 is defined as f, and a focal length of the first lens L1 is defined as f1. The camera optical lens 10 satisfies the following condition: $0.73 \leq f1/f \leq 2.72$, which specifies a ratio of the focal length of the first lens L1 and the focal length of the camera optical lens 10. When the value is within this range, the first has an appropriate positive refractive power, which is beneficial for correcting an aberration of the camera optical lens 10 and the development towards ultra-thin and wide-angle lenses. Preferably, the camera optical lens 10 satisfies the following condition: $1.17 \leq f1/f \leq 2.18$.

A curvature radius of the object-side surface of the first lens L1 is defined as R1 and a curvature radius of the image-side surface of the first lens L1 is defined as R2. The camera optical lens 10 satisfies the following condition: $-5.72 \leq (R1+R2)/(R1-R2) \leq -1.78$, which reasonably controls a shape of the first lens, so that the first lens may effectively correct a spherical aberration of the camera optical lens 10. Preferably, the following condition shall be satisfied: $-3.58 \leq (R1+R2)/(R1-R2) \leq -2.22$.

The on-axis thickness of the first lens L1 is defined as d1, which satisfies the following condition: $0.03 \leq d1/TTL \leq 0.18$. When the condition is satisfied, it is beneficial for realization of ultra-thin lenses. Preferably, the following condition shall be satisfied: $0.05 \leq d1/TTL \leq 0.15$.

In this embodiment, the second lens L2 has a positive refractive power.

The focal length of the camera optical lens 10 is defined as f, and the focal length of the second lens L2 is defined as f2. The camera optical lens 10 satisfies the following condition: $7.19 \leq f2/f \leq 49.63$. When the condition is satisfied, a positive refractive power of the second lens L2 is controlled within a reasonable range, which is beneficial for correcting an aberration of the camera optical lens 10. Preferably, the following condition shall be satisfied: $11.51 \leq f2/f \leq 39.71$.

A curvature radius of the object-side surface of the second lens L2 is defined as R3 and a curvature radius of the image-side surface of the second lens L2 is defined as R4 The camera optical lens 10 satisfies the following condition: $-7.05 \leq (R3+R4)/(R3-R4) \leq 6.26$, which specifies a shape of the second lens L2. When the value id within this range, with a development towards ultra-thin and wide-angle lenses, it is beneficial for solving a problem of on-axis aberration. Preferably, the following condition shall be satisfied: $-4.41 \leq (R3+R4)/(R3-R4) \leq 5.01$.

The on-axis thickness of the second lens L2 is defined as d3, which satisfies the following condition: $0.02 \leq d3/TTL \leq 0.20$. When the condition is satisfied, it is beneficial for the realization of ultra-thin lenses. Preferably, the following condition shall be satisfied: $0.03 \leq d3/TTL \leq 0.16$.

In this embodiment, an image-side surface of the third lens L3 is concave in the paraxial region, and the third lens L3 has a negative refractive power.

The focal length of the camera optical lens 10 is defined as f and the focal length of the third lens L3 is defined as f3. The camera optical lens 10 satisfies the following condition: $-3.34 \leq f3/f \leq -0.91$. An appropriate distribution of the refractive power leads to better imaging quality and lower sensitivity. Preferably, the following condition shall be satisfied: $-2.08 \leq f3/f \leq -1.14$.

A curvature radius of the object-side surface of the third lens L3 is defined as R5 and a curvature radius of the image-side surface of the third lens L3 is defined as R6 The camera optical lens 10 satisfies the following condition: $0.50 \leq (R5+R6)/(R5-R6) \leq 2.01$. A shape of the third lens L3 is effectively controlled, thereby facilitating shaping of the third lens L3 and avoiding bad shaping and generation of stress due to an overly large surface curvature of the third lens L3. Preferably, the following condition shall be satisfied: $0.80 \leq (R5+R6)/(R5-R6) \leq 1.61$.

An on-axis thickness of the third lens L3 is defined as d5, which satisfies the following condition: $0.05 \leq d5/TTL \leq 0.17$. When the condition is satisfied, it is beneficial for the realization of ultra-thin lenses. Preferably, the following condition shall be satisfied: $0.08 \leq d5/TTL \leq 0.14$.

In this embodiment, an object-side surface of the fourth lens L4 is concave in the paraxial region and an image-side surface of the fourth lens L4 is convex in the paraxial region, and the fourth lens L4 has a positive refractive power.

The focal length of the camera optical lens 10 is defined as f and a focal length of the fourth lens L4 is defined as f4. The camera optical lens 10 satisfies the following condition: $0.42 \leq f4/f \leq 1.33$. When the condition is satisfied, the appropriate distribution of the refractive power makes it possible that the camera optical lens 10 has the better imaging quality and lower sensitivity. Preferably, the following condition shall be satisfied: $0.67 \leq f4/f \leq 1.06$.

A curvature radius of the object-side surface of the fourth lens L4 is defined as R7 and a curvature radius of the image-side surface of the fourth lens L4 is defined as R8. The camera optical lens 10 satisfies the following condition: $0.52 \leq (R7+R8)/(R7-R8) \leq 1.97$, which specifies a shape of the fourth lens L4. When the value is within this range, with the development towards ultra-thin and wide-angle lens, it is beneficial for solving a problem like an off-axis aberration. Preferably, the following condition shall be satisfied: $0.83 \leq (R7+R8)/(R7-R8) \leq 1.58$.

An on-axis thickness of the fourth lens L4 is defined as d7, which satisfies the following condition: $0.04 \leq d7/TTL \leq 0.16$. When the condition is satisfied, it is beneficial for the realization of ultra-thin lenses. Preferably, the following condition shall be satisfied: $0.07 \leq d7/TTL \leq 0.13$.

In this embodiment, an object-side surface of the fifth lens L5 is convex in the paraxial region and an image-side surface of the fifth lens L5 is convex in the paraxial region, and the fifth lens L5 has a positive refractive power.

The focal length of the camera optical lens 10 is defined as f and a focal length of the fifth lens L5 is defined as f5. The camera optical lens 10 satisfies the following condition: $1.34 \leq f5/f \leq 4.69$, which can effectively make a light angle of the camera lens gentle and reduce tolerance sensitivity. Preferably, the following condition shall be satisfied: $2.15 \leq f5/f \leq 3.75$.

A curvature radius of an object-side surface of the fifth lens L5 is defined as R9 and a curvature radius of an image-side surface of the fifth lens L5 is defined as R10. The camera optical lens 10 satisfies the following condition: $-0.73 \leq (R9+R10)/(R9-R10) \leq 0.13$, which specifies a shape of the fifth lens L5. When the value is within this range, with the development towards ultra-thin and wide-angle lenses, it is beneficial for solving the problem like the off-axis aberration. Preferably, the following condition shall be satisfied: $-0.46 \leq (R9+R10)/(R9-R10) \leq 0.10$.

An on-axis thickness of the fifth lens L5 is defined as d9, which satisfies the following condition: $0.03 \leq d9/TTL \leq 0.09$. When the condition is satisfied, it is beneficial for the realization of ultra-thin lenses. Preferably, the following condition shall be satisfied: $0.05 \leq d9/TTL \leq 0.08$.

In this embodiment, an object-side surface of the sixth lens L6 is convex in the paraxial region, an image-side surface of the sixth lens L6 is concave in the paraxial region. The sixth lens L6 has a negative refractive power.

The focal length of the camera optical lens 10 is defined as f and a focal length of the sixth lens L6 is defined as f6. The camera optical lens 10 satisfies the following condition: $-2.42 \leq f6/f \leq -0.66$. When the condition is satisfied, the appropriate distribution of the refractive power makes it possible that the camera optical lens 10 has the better imaging quality and lower sensitivity. Preferably, the following condition shall be satisfied: $-1.52 \leq f6/f \leq -0.82$.

A curvature radius of the object-side surface of the sixth lens L6 is defined as R11 and a curvature radius of the image-side surface of the sixth lens L6 is defined as R12. The camera optical lens 10 satisfies the following condition: $0.96 \leq (R11+R12)/(R11-R12) \leq 3.32$, which specifies a shape of the sixth lens L6. When the value is within this range, with the development towards ultra-thin and wide-angle lenses, it is beneficial for solving a problem like the off-axis aberration. Preferably, the following condition shall be satisfied: $1.54 \leq (R11+R12)/(R11-R12) \leq 2.66$.

An on-axis thickness of the sixth lens L6 is defined as d11, which satisfies the following condition: $0.04 \leq d11/TTL \leq 0.12$. When the condition is satisfied, it is beneficial for the realization of ultra-thin lenses. Preferably, the following condition shall be satisfied: $0.06 \leq d11/TTL \leq 0.10$.

In this embodiment, the focal length of the camera optical lens is defined as f and a combined focal length of the first lens and the second lens is defined as f12. The camera optical lens 10 satisfies the following condition: $0.69 \leq f12/f \leq 2.58$. In this way, the aberration and distortion of the camera optical lens may be removed, and a back focal length of the camera optical lens may be reduced, so that miniaturization of the camera optical lens is maintained. Preferably, the following condition shall be satisfied: $1.10 \leq f12/f \leq 2.06$.

In this embodiment, the TTL of the camera optical lens 10 is less than or equal to 5.16 mm, which is beneficial for the realization of ultra-thin lenses. Preferably, the TTL of the camera optical lens 10 is less than or equal to 4.92 mm.

In this embodiment, an F number of the camera optical lens 10 is less than or equal to 2.06 mm. The camera optical lens 10 has a large F number and better imaging performance. Preferably, the F number of the camera optical lens 10 is less than or equal to 2.02 mm.

With such design, the TTL of the camera optical lens 10 can be made as short as possible, thus the miniaturization characteristics can be maintained.

In the following, an example will be used to describe the camera optical lens 10 of the present disclosure. Symbols recorded in each example are as follows. A unit of a focal length, an on-axis distance, a curvature radius, an on-axis thickness, an inflexion point position and an arrest point position is mm.

TTL: a total optical length from an object-side surface of the first lens to an image surface of the camera optical lens along an optic axis, with a unit of mm.

Preferably, inflexion points and/or arrest points can also be arranged on the object-side surface and/or image-side surface of the lens, so that the demand for high quality imaging can be satisfied, the description below can be referred for specific implementable scheme.

Design data of the camera optical lens 10 in Embodiment 1 of the present disclosure is shown in the tables 1 and 2.

TABLE 1

| | R | d | nd | vd |
|---|---|---|---|---|
| S1 | ∞ | d0= -0.199 | | |
| R1 | 1.651 | d1= 0.573 | nd1 1.5467 | v1 55.82 |
| R2 | 3.425 | d2= 0.078 | | |
| R3 | -16.826 | d3= 0.198 | nd2 1.5467 | v2 55.82 |
| R4 | -10.324 | d4= 0.253 | | |
| R5 | -1099.533 | d5= 0.483 | nd3 1.6686 | v3 20.53 |
| R6 | 3.242 | d6= 0.103 | | |
| R7 | -13.524 | d7= 0.500 | nd4 1.7543 | v4 44.94 |
| R8 | -1.847 | d8= 0.364 | | |
| R9 | 10.659 | d9= 0.294 | nd5 1.5467 | v5 55.82 |
| R10 | -9.019 | d10= 0.347 | | |
| R11 | 3.410 | d11= 0.348 | nd6 1.5369 | v6 55.69 |
| R12 | 1.195 | d12= 0.540 | | |

TABLE 1-continued

| | R | d | nd | vd |
|---|---|---|---|---|
| R13 | ∞ | d13= 0.210 | ndg 1.5168 | vg 64.17 |
| R14 | ∞ | d14= 0.398 | | |

Meanings of the above symbols are as follows.

S1: Aperture;

R: curvature radius of an optical surface, or a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of an object-side surface of the optical filter GF;

R14: curvature radius of an image-side surface of the optical filter GF;

d: on-axis thickness of the lens or a on-axis distance between the lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the optical filter GF;

d13: on-axis thickness of the optical filter GF;
d14: on-axis distance from an image-side surface to an image surface of the optical filter GF;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspherical surface data of the camera optical lens 10 in Embodiment 1 of the present disclosure.

For convenience, an aspheric surface of each lens surface uses the aspheric surfaces shown in the above condition (1). However, the present disclosure is not limited to the aspherical polynomial form shown in the condition (1).

Table 3 and table 4 show design data of the inflexion points and the arrest point of the camera optical lens 10 in Embodiment 1 of the present disclosure. Herein, P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" are vertical

TABLE 2

| | Conic coefficient | Aspherical surface coefficients | | | |
|---|---|---|---|---|---|
| | k | A4 | A6 | A8 | A10 |
| R1 | −1.4500E+01 | 5.2800E−01 | −1.3800E+00 | 2.6500E+00 | −2.5500E+00 |
| R2 | −4.9800E+00 | −1.2800E−01 | −6.6700E−03 | 3.8600E−02 | 4.7800E−01 |
| R3 | −4.0000E+02 | −2.9600E−01 | 3.6000E−01 | 6.4200E−01 | −1.5800E+00 |
| R4 | −2.5800E+02 | −2.9900E−01 | 2.3700E−01 | 1.4900E+00 | −3.7000E+00 |
| R5 | 1.3300E+02 | −5.0900E−01 | 1.2900E−01 | 2.5200E−01 | −1.1800E+01 |
| R6 | 5.4400E+00 | −1.5400E−01 | −2.5600E−01 | 6.2600E−01 | −8.0000E−01 |
| R7 | −4.0000E+02 | 7.6300E−02 | −8.9300E−02 | 3.7600E−02 | 3.0000E−02 |
| R8 | −1.5400E+01 | −3.0800E−01 | 6.1500E−01 | −9.3700E−01 | 1.0000E+00 |
| R9 | −4.0000E+02 | −3.0800E−02 | −3.6300E−03 | 1.1700E−03 | 3.9900E−05 |
| R10 | −1.4200E+02 | −7.5800E−02 | 4.3600E−02 | −7.5100E−03 | −8.5600E−04 |
| R11 | −1.2300E+02 | −3.1400E−01 | 1.9400E−01 | −5.5300E−02 | 9.1500E−03 |
| R12 | −1.0400E+01 | −1.1600E−01 | 5.5400E−02 | −1.4600E−02 | 2.0600E−03 |

| | Aspherical surface coefficients | | | | |
|---|---|---|---|---|---|
| | A12 | A14 | A16 | A18 | A20 |
| R1 | −5.2800E−01 | 5.5600E+00 | −8.9500E+00 | 6.8100E+00 | −2.0300E+00 |
| R2 | −1.3100E+00 | −3.8300E−01 | 8.2300E−01 | 5.9000E−01 | −4.1400E−01 |
| R3 | −3.9500E+00 | 2.2400E+01 | −3.6300E+01 | 2.2200E+01 | −3.6300E+00 |
| R4 | −5.2500E+00 | 5.2600E+01 | −1.1500E+02 | 1.0600E+02 | −3.7500E+01 |
| R5 | 2.4400E+01 | −1.4100E+01 | −3.2500E+01 | 5.9400E+01 | −2.8600E+01 |
| R6 | 3.5500E−01 | 2.7200E−01 | −4.4700E−01 | 2.2700E−01 | −3.8600E−02 |
| R7 | −2.3000E−02 | −2.7700E−02 | 7.8600E−03 | 1.5400E−02 | −6.1100E−03 |
| R8 | −5.1000E−01 | −8.4300E−03 | 1.2300E−01 | −4.7900E−02 | 5.8200E−03 |
| R9 | 3.0500E−05 | 6.8800E−05 | 2.9100E−05 | 1.2400E−05 | −4.9800E−06 |
| R10 | 1.5400E−04 | 7.2700E−05 | 6.5600E−06 | −7.1400E−08 | −1.0800E−06 |
| R11 | −6.7700E−04 | −2.5300E−04 | 6.9100E−05 | 1.8000E−06 | −1.2000E−06 |
| R12 | −3.6800E−05 | −3.6600E−05 | 3.6000E−06 | 2.6500E−07 | −4.0100E−08 |

Herein, K is a conic coefficient, A4, A6, A8, A10, A12, A14, A16, A18 and A20 are aspheric surface coefficients.
IH: an image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 3

| | Inflexion point number | Inflexion point position 1 | Inflexion point position 2 | Inflexion point position 3 | Inflexion point position 4 |
|---|---|---|---|---|---|
| P1R1 | 1 | 0.805 | 0 | 0 | 0 |
| P1R2 | 1 | 0.435 | 0 | 0 | 0 |
| P2R1 | 2 | 0.585 | 0.685 | 0 | 0 |

TABLE 3-continued

| | Inflexion point number | Inflexion point position 1 | Inflexion point position 2 | Inflexion point position 3 | Inflexion point position 4 |
|---|---|---|---|---|---|
| P2R2 | 2 | 0.515 | 0.815 | 0 | 0 |
| P3R1 | 0 | 0 | 0 | 0 | 0 |
| P3R2 | 2 | 0.385 | 1.065 | 0 | 0 |
| P4R1 | 2 | 0.285 | 0.785 | 0 | 0 |
| P4R2 | 2 | 0.785 | 1.115 | 0 | 0 |
| P5R1 | 3 | 0.375 | 1.345 | 1.625 | 0 |
| P5R2 | 2 | 1.125 | 1.805 | 0 | 0 |
| P6R1 | 4 | 0.225 | 1.125 | 1.565 | 1.835 |
| P6R2 | 1 | 0.465 | 0 | 0 | 0 |

TABLE 4

| | Arrest point number | Arrest point position 1 | Arrest point position 2 |
|---|---|---|---|
| P1R1 | 0 | 0 | 0 |
| P1R2 | 1 | 0.665 | 0 |
| P2R1 | 0 | 0 | 0 |
| P2R2 | 2 | 0.665 | 0.875 |
| P3R1 | 0 | 0 | 0 |
| P3R2 | 2 | 0.665 | 1.155 |
| P4R1 | 2 | 0.585 | 0.885 |
| P4R2 | 0 | 0 | 0 |
| P5R1 | 1 | 0.665 | 0 |
| P5R2 | 1 | 1.635 | 0 |
| P6R1 | 1 | 0.405 | 0 |
| P6R2 | 1 | 1.285 | 0 |

Figure 2:
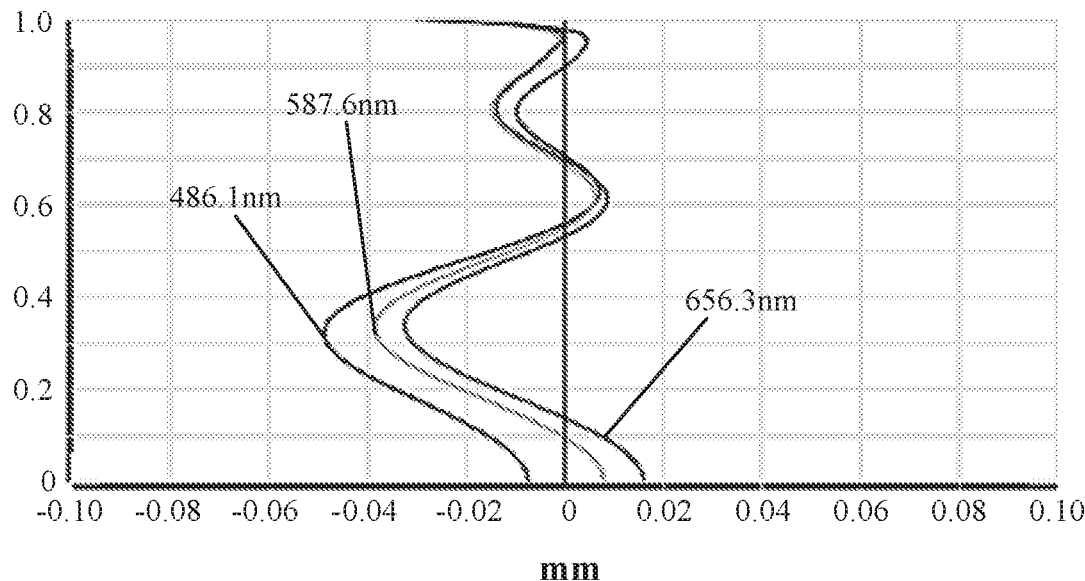
FIG. 2 is a schematic diagram of a longitudinal aberration of the camera optical lens shown in FIG. 1.
Figure 3:
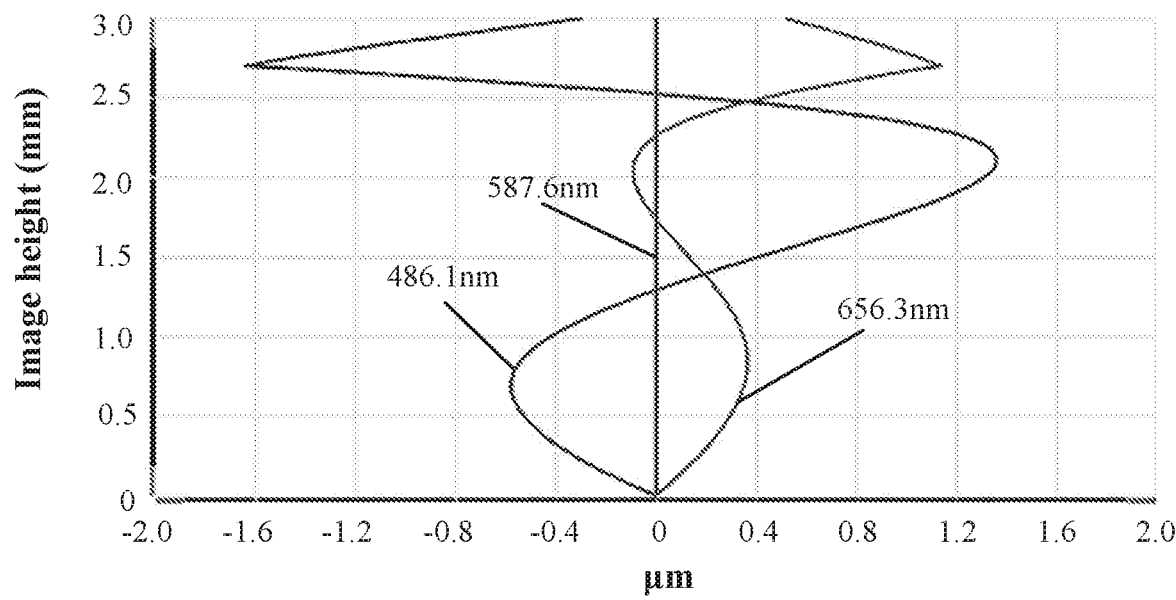
FIG. 3 is a schematic diagram of a lateral color of the camera optical lens shown in FIG. 1.
Figure 4:
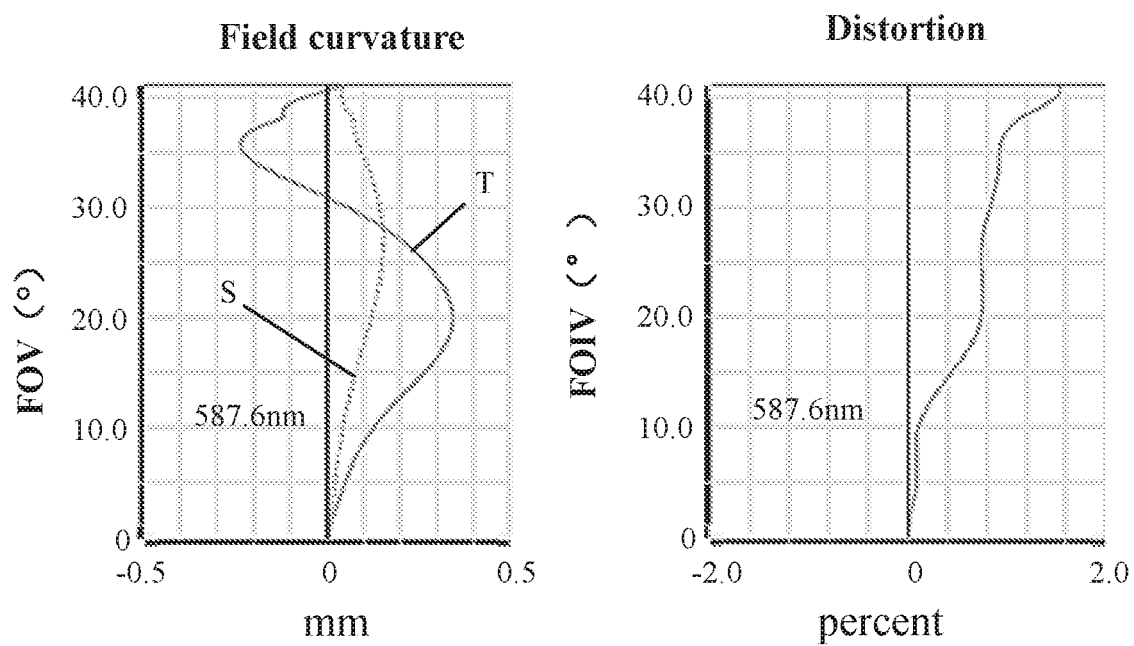
FIG. 4 is a schematic diagram of a field curvature and a distortion of the camera optical lens shown in FIG. 1.
Figure 5:
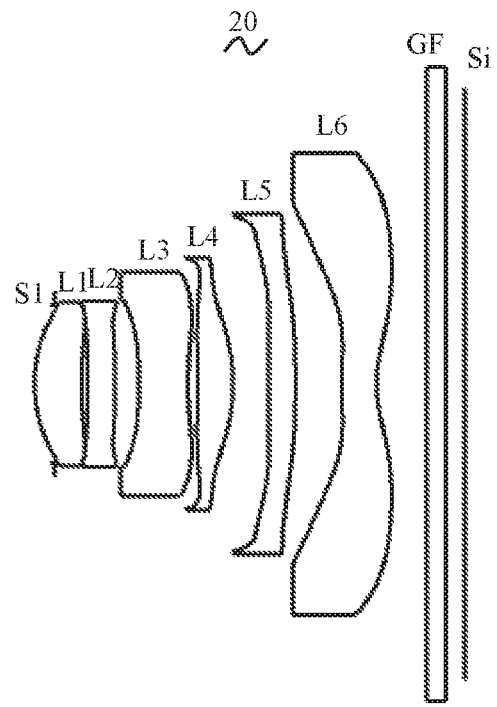
FIG. 5 is a schematic diagram of a structure of a camera optical lens in accordance with Embodiment 2 of the present disclosure.

FIG. 2 and FIG. 3 show schematic diagrams of a longitudinal aberration and a lateral color obtained when light with wavelengths of 486.1 nm, 587.6 nm, and 656.3 nm passes through the camera optical lens 10 in Embodiment 1. FIG. 4 shows schematic diagrams of a field curvature and a distortion obtained when light with a wavelength of 587.6 nm passes through the camera optical lens 10 in Embodiment 1. The field curvature S in FIG. 4 is a field curvature in the sagittal direction, and T is a field curvature in a tangential direction.

The following Table 13 shows various values of Embodiments 1, 2, 3 corresponding to the parameters which are already specified in the conditions.

As shown in Table 13, Embodiment 1 satisfies the various conditions.

In this embodiment, an entrance pupil diameter of the camera optical lens is 1.680 mm, an image height of 1.0H is 3.000 mm, an FOV (field of view) is 82.14°. Thus, the camera optical lens has a wide-angle and is ultra-thin. Its on-axis and off-axis aberrations are fully corrected, thereby achieving excellent optical characteristics.

Embodiment 2

Embodiment 2 is substantially the same with Embodiment 1, and the meanings of symbols in this embodiment are the same with that of Embodiment 1. In the following, only differences are described.

Table 5 and table 6 show design data of a camera optical lens 20 in Embodiment 2 of the present disclosure.

TABLE 5

| | R | | d | | nd | | vd |
|---|---|---|---|---|---|---|---|
| S1 | ∞ | d0= | −0.209 | | | | |
| R1 | 1.606 | d1= | 0.499 | nd1 | 1.5444 | v1 | 55.82 |
| R2 | 3.530 | d2= | 0.074 | | | | |
| R3 | 381.436 | d3= | 0.285 | nd2 | 1.5444 | v2 | 55.82 |
| R4 | −41.713 | d4= | 0.254 | | | | |
| R5 | 1103.683 | d5= | 0.530 | nd3 | 1.6610 | v3 | 20.53 |
| R6 | 3.057 | d6= | 0.104 | | | | |
| R7 | −14.979 | d7= | 0.382 | nd4 | 1.7504 | v4 | 44.94 |
| R8 | −1.892 | d8= | 0.377 | | | | |
| R9 | 9.098 | d9= | 0.290 | nd5 | 1.5444 | v5 | 55.82 |
| R10 | −14.097 | d10= | 0.494 | | | | |
| R11 | 3.655 | d11= | 0.374 | nd6 | 1.5346 | v6 | 55.69 |
| R12 | 1.156 | d12= | 0.540 | | | | |
| R13 | ∞ | d13= | 0.210 | ndg | 1.5168 | vg | 64.17 |
| R14 | ∞ | d14= | 0.198 | | | | |

Table 6 shows aspherical surface data of each lens of the camera optical lens 20 in Embodiment 2 of the present disclosure.

TABLE 6

| | Conic coefficient | Aspherical surface coefficients | | | |
|---|---|---|---|---|---|
| | k | A4 | A6 | A8 | A10 |
| R1 | −1.4300E+01 | 5.6300E−01 | −1.3700E+00 | 2.6500E+00 | −2.5600E+00 |
| R2 | −8.0900E+00 | −1.3000E−01 | 1.6100E−02 | 7.9700E−02 | 4.9300E−01 |
| R3 | −3.9900E+02 | −3.0400E−01 | 3.3800E−01 | 6.2800E−01 | −1.5800E+00 |
| R4 | −2.2800E+02 | −2.4600E−01 | 1.8200E−01 | 1.4600E+00 | −3.7100E+00 |
| R5 | 3.9600E+02 | −5.0400E−01 | 1.4800E−01 | 2.5800E+00 | −1.1700E+01 |
| R6 | 4.4400E+00 | −1.7700E−01 | −2.1800E−01 | 6.4000E−01 | −7.9900E−01 |
| R7 | −4.0000E+02 | 7.7000E−02 | −8.4000E−02 | 5.1900E−02 | 3.3900E−02 |
| R8 | −1.7300E+01 | −3.0000E−01 | 6.2700E−01 | −9.3800E−01 | 1.0000E+00 |
| R9 | −4.0000E+02 | −4.2900E−02 | −2.2100E−03 | 1.4100E−03 | 1.7500E−06 |
| R10 | −3.6700E+02 | −7.3700E−02 | 4.4400E−02 | −7.6300E−03 | −8.6800E−04 |
| R11 | −1.2800E+02 | −3.1200E−01 | 1.9000E−01 | −5.5500E−02 | 9.1100E−03 |
| R12 | −9.5900E+00 | −1.1800E−01 | 5.4600E−02 | −1.4600E−02 | 2.0700E−03 |

TABLE 6-continued

| | Aspherical surface coefficients | | | | |
|---|---|---|---|---|---|
| | A12 | A14 | A16 | A18 | A20 |
| R1 | −5.4500E−01 | 5.5500E+00 | −8.9500E+00 | 6.8200E+00 | −2.0000E+00 |
| R2 | −1.3000E+00 | −3.7000E−01 | 8.3200E−01 | 5.8400E−01 | −4.6400E−01 |
| R3 | −3.9400E+00 | 2.2400E+01 | −3.6200E+01 | 2.2300E+01 | −3.4800E+00 |
| R4 | −5.2400E+00 | 5.2700E+01 | −1.1500E+02 | 1.0600E+02 | −3.7500E+01 |
| R5 | 2.4500E+01 | −1.4100E+01 | −3.2600E+01 | 5.9300E+01 | −2.8600E+01 |
| R6 | 3.5300E−01 | 2.7000E−01 | −4.4900E−01 | 2.2500E−01 | −4.0200E−02 |
| R7 | −2.3700E−02 | −2.8800E−02 | 7.2200E−03 | 1.5100E−02 | −6.2400E−03 |
| R8 | −5.1000E−01 | −8.0600E−03 | 1.2300E−01 | −4.7900E−02 | 5.7400E−03 |
| R9 | 4.7000E−05 | 9.0500E−05 | 3.7300E−05 | 1.0600E−06 | −7.6000E−06 |
| R10 | 1.2800E−04 | 6.2600E−05 | 5.3400E−06 | −4.1400E−08 | −8.7100E−07 |
| R11 | −6.5800E−04 | −2.4400E−04 | 7.1500E−05 | 1.8800E−06 | −1.3900E−06 |
| R12 | −3.5300E−05 | −3.6700E−05 | 3.5400E−06 | 2.6100E−07 | −3.7100E−08 |

Table 7 and table 8 show design data of inflexion points and arrest points of the camera optical lens 20 lens in Embodiment 2 of the present disclosure.

TABLE 7

| | Inflexion point number | Inflexion point position 1 | Inflexion point position 2 | Inflexion point position 3 | Inflexion point position 4 |
|---|---|---|---|---|---|
| P1R1 | 1 | 0.805 | 0 | 0 | 0 |
| P1R2 | 1 | 0.455 | 0 | 0 | 0 |
| P2R1 | 3 | 0.035 | 0.635 | 0.665 | 0 |
| P2R2 | 2 | 0.505 | 0.825 | 0 | 0 |
| P3R1 | 1 | 0.015 | 0 | 0 | 0 |
| P3R2 | 1 | 0.395 | 0 | 0 | 0 |
| P4R1 | 2 | 0.275 | 0.995 | 0 | 0 |
| P4R2 | 2 | 0.735 | 1.165 | 0 | 0 |
| P5R1 | 3 | 0.335 | 1.345 | 1.555 | 0 |
| P5R2 | 2 | 1.065 | 1.745 | 0 | 0 |
| P6R1 | 4 | 0.215 | 1.245 | 1.425 | 1.745 |
| P6R2 | 1 | 0.465 | 0 | 0 | 0 |

TABLE 8

| | Arrest point number | Arrest point position 1 | Arrest point position 2 |
|---|---|---|---|
| P1R1 | 0 | 0 | 0 |
| P1R2 | 1 | 0.685 | 0 |
| P2R1 | 1 | 0.045 | 0 |
| P2R2 | 2 | 0.635 | 0.875 |
| P3R1 | 1 | 0.025 | 0 |
| P3R2 | 1 | 0.705 | 0 |
| P4R1 | 2 | 0.515 | 1.145 |
| P4R2 | 0 | 0 | 0 |
| P5R1 | 1 | 0.615 | 0 |
| P5R2 | 0 | 0 | 0 |
| P6R1 | 1 | 0.395 | 0 |
| P6R2 | 1 | 1.205 | 0 |

Figure 6:
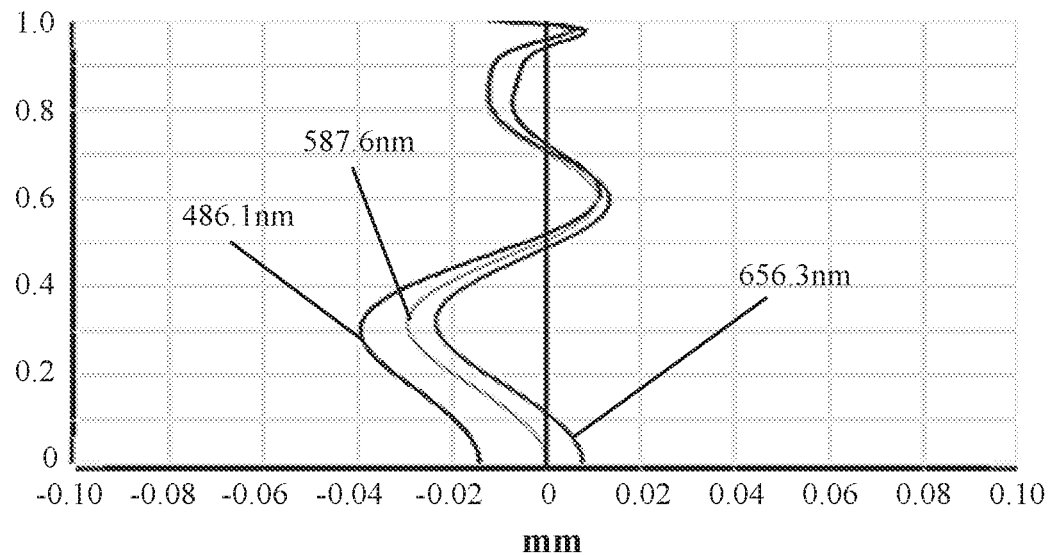
FIG. 6 is a schematic diagram of a longitudinal aberration of the camera optical lens shown in FIG. 5.
Figure 7:
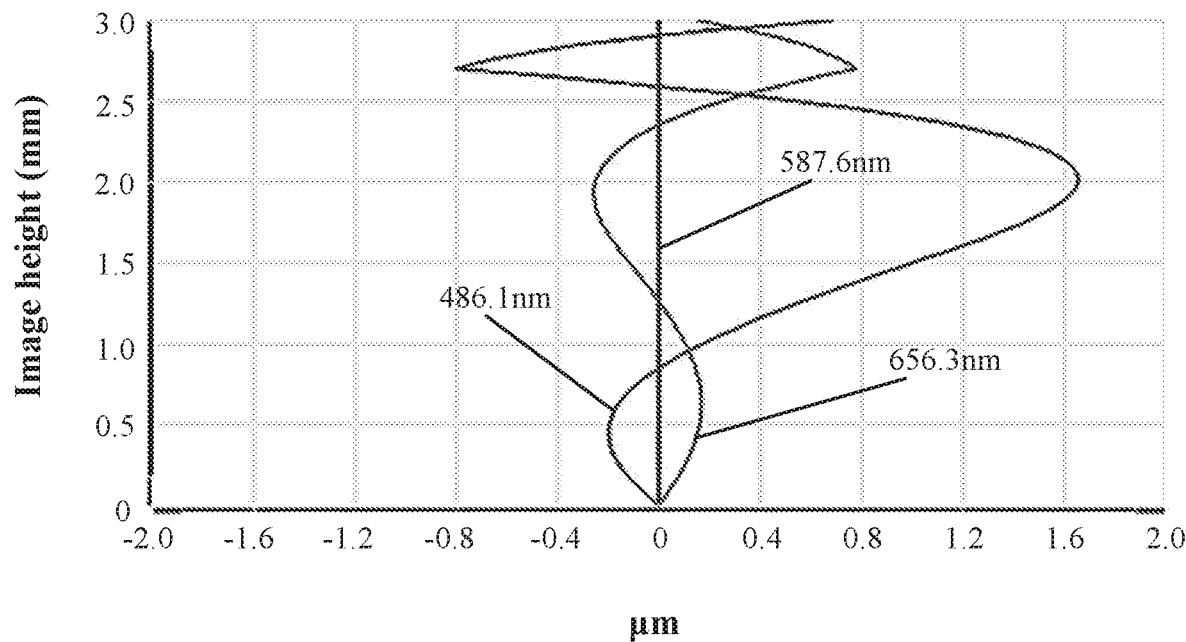
FIG. 7 is a schematic diagram of a lateral color of the camera optical lens shown in FIG. 5.
Figure 8:
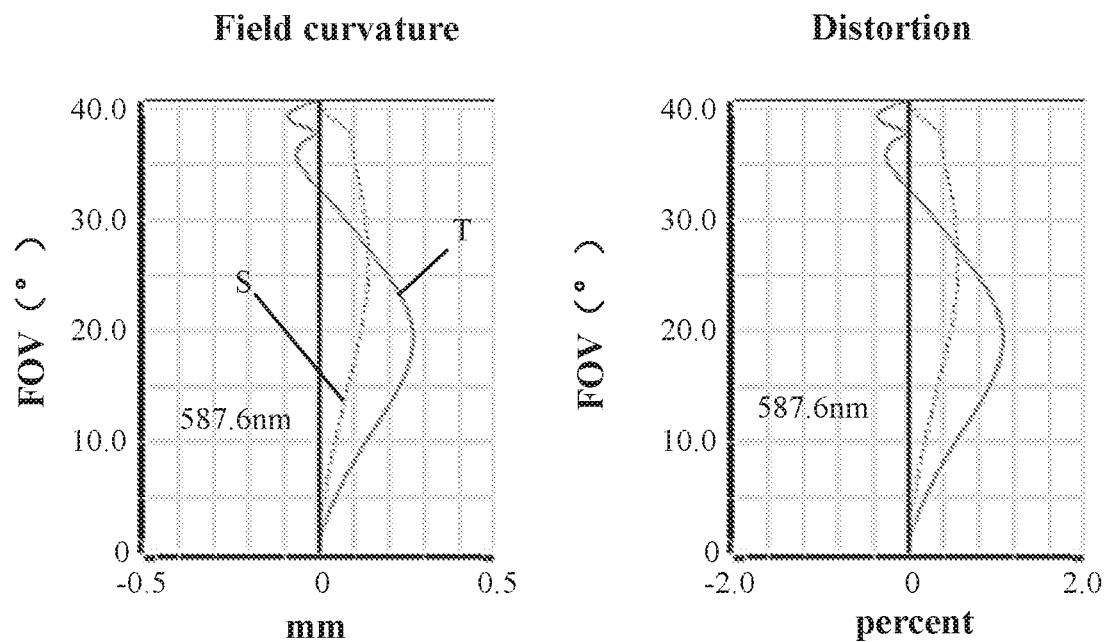
FIG. 8 is a schematic diagram of a field curvature and a distortion of the camera optical lens shown in FIG. 5.
Figure 9:
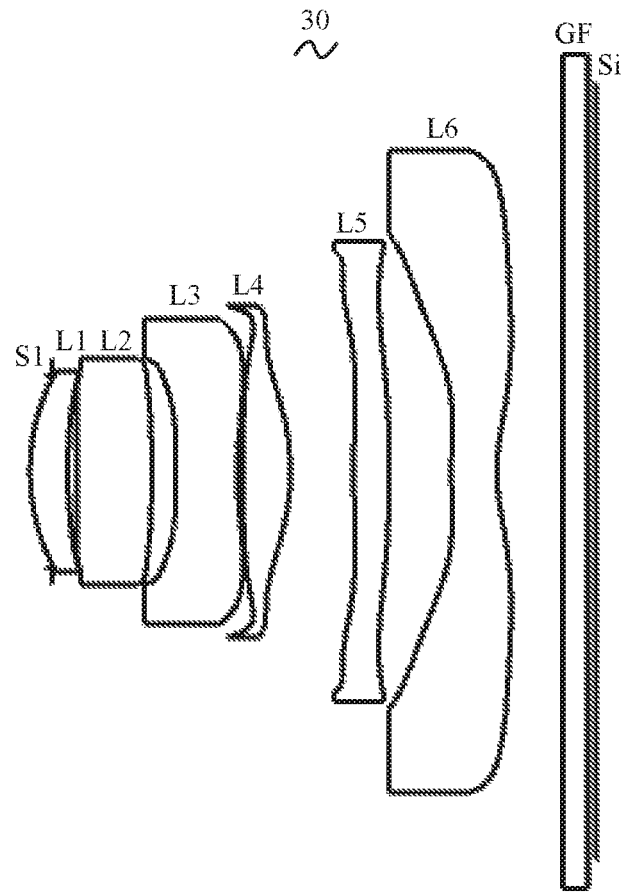
FIG. 9 is a schematic diagram of a structure of a camera optical lens in accordance with Embodiment 3 of the present disclosure.

FIG. 6 and FIG. 7 show schematic diagrams of a longitudinal aberration and a lateral color obtained when light with wavelengths of 486.1 nm, 587.6 nm and 656.3 nm passes through the camera optical lens 20 in Embodiment 2. FIG. 8 shows schematic diagrams of a field curvature and a distortion obtained when light with a wavelength of 587.6 nm passes through the camera optical lens 20 in Embodiment 2.

As shown in Table 13, Embodiment 2 satisfies the various conditions.

In this embodiment, an entrance pupil diameter of the camera optical lens is 1.696 mm, an image height of 1.0H is 3.000 mm, an FOV (field of view) is 81.51°. Thus, the camera optical lens has a wide-angle and is ultra-thin. Its on-axis and off-axis chromatic aberrations are fully corrected, thereby achieving excellent optical characteristics.

Embodiment 3

Embodiment 3 is substantially the same with Embodiment 1, and the meanings of symbols in this embodiment are the same as that of Embodiment 1. In the following, only differences are described.

Table 9 and table 10 show design data of a camera optical lens 30 in Embodiment 3 of the present disclosure.

TABLE 9

| | R | D | | Nd | Nd |
|---|---|---|---|---|---|
| S1 | ∞ | d0= | −0.175 | | |
| R1 | 1.711 | d1= | 0.308 | nd1 | 1.5444 v1 55.82 |
| R2 | 3.601 | d2= | 0.078 | | |
| R3 | 25.127 | d3= | 0.603 | nd2 | 1.5444 v2 55.82 |
| R4 | 45.036 | d4= | 0.199 | | |
| R5 | 20.160 | d5= | 0.499 | nd3 | 1.6610 v3 20.53 |
| R6 | 2.911 | d6= | 0.050 | | |
| R7 | −100.676 | d7= | 0.383 | nd4 | 1.7504 v4 44.94 |
| R8 | −2.034 | d8= | 0.518 | | |
| R9 | 7.754 | d9= | 0.288 | nd5 | 1.5444 v5 55.82 |
| R10 | −16.630 | d10= | 0.506 | | |
| R11 | 3.108 | d11= | 0.367 | nd6 | 1.5346 v6 55.69 |
| R12 | 1.175 | d12= | 0.540 | | |
| R13 | ∞ | d13= | 0.210 | ndg | 1.5168 vg 64.17 |
| R14 | ∞ | d14= | 0.055 | | |

Table 10 shows aspherical surface data of each lens of the camera optical lens 30 in Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | −2.0700E+01 | 5.5000E−01 | −1.3800E+00 | 2.6300E+00 | −2.5800E+00 |
| R2 | −3.6300E−01 | −1.0500E−01 | 7.9600E−02 | 1.5100E−01 | 5.7300E−01 |
| R3 | 4.0000E+02 | −2.3900E−01 | 3.5900E−01 | 6.3700E−01 | −1.5700E+00 |
| R4 | −4.0000E+02 | −3.3100E−01 | 2.2800E−01 | 1.2600E+00 | −3.7400E+00 |
| R5 | −2.4800E+02 | −5.2200E−01 | −2.5000E−02 | 2.8500E+00 | −1.1800E+01 |
| R6 | 4.0700E+00 | −1.6100E−01 | −2.3600E−01 | 6.6500E−01 | −8.1500E−01 |
| R7 | −4.0000E+02 | 1.1600E−01 | −1.1200E−01 | 5.8000E−02 | 4.4100E−02 |
| R8 | −1.7400E+01 | −3.0200E−01 | 6.4300E−01 | −9.3900E−01 | 9.9400E−01 |
| R9 | −4.1900E+02 | −3.8300E−02 | −9.6800E−03 | 4.5400E−03 | 5.8700E−04 |
| R10 | −4.0000E+02 | −6.4400E−02 | 3.9500E−02 | −6.7400E−03 | 2.8800E−04 |
| R11 | −2.6300E+02 | −2.9900E−01 | 1.8600E−01 | −5.3200E−02 | 8.5000E−03 |
| R12 | −1.7300E+01 | −1.0800E−01 | 5.4100E−02 | −1.4700E−02 | 2.1500E−03 |

| | Aspherical surface coefficients | | | | |
|---|---|---|---|---|---|
| | A12 | A14 | A16 | A18 | A20 |
| R1 | −5.6700E−01 | 5.5300E+00 | −8.9400E+00 | 6.8900E+00 | −1.8000E+00 |
| R2 | −1.2000E+00 | −2.4300E−01 | 9.9600E−01 | 7.9000E−01 | −2.3800E−01 |
| R3 | −3.9100E+00 | 2.2500E+01 | −3.6100E+01 | 2.2600E+01 | −2.9000E+00 |
| R4 | −5.2800E+00 | 5.2500E+01 | −1.1400E+02 | 1.0600E+02 | −3.7200E+01 |
| R5 | 2.4600E+01 | −1.4100E+01 | −3.2900E+01 | 5.8900E+01 | −2.8000E+01 |
| R6 | 3.5200E−01 | 2.7400E−01 | −4.4800E−01 | 2.2100E−01 | −3.8700E−02 |
| R7 | −2.6200E−02 | −3.2800E−02 | 7.6000E−03 | 1.6600E−02 | −6.9700E−03 |
| R8 | −5.0700E−01 | −6.0200E−03 | 1.2200E−01 | −4.8900E−02 | 6.0900E−03 |
| R9 | 9.5100E−05 | 6.5700E−05 | 1.1300E−06 | −1.6200E−05 | 4.1900E−07 |
| R10 | −9.2300E−05 | −2.7000E−05 | 1.0300E−05 | 7.3200E−06 | −1.7700E−06 |
| R11 | −6.8500E−04 | −2.1600E−04 | 7.2500E−05 | 6.1200E−07 | −1.3600E−06 |
| R12 | −4.2000E−05 | −3.7400E−05 | 3.6900E−06 | 2.5100E−07 | −3.7200E−08 |

Table 11 and table 12 show design data of inflexion points and arrest points of the camera optical lens 30 lens in Embodiment 3 of the present disclosure.

TABLE 11

| | Inflexion point number | Inflexion point position 1 | Inflexion point position 2 | Inflexion point position 3 |
|---|---|---|---|---|
| P1R1 | 0 | 0 | 0 | 0 |
| P1R2 | 0 | 0 | 0 | 0 |
| P2R1 | 2 | 0.125 | 0.475 | 0 |
| P2R2 | 3 | 0.085 | 0.615 | 0.735 |
| P3R1 | 1 | 0.095 | 0 | 0 |
| P3R2 | 1 | 0.415 | 0 | 0 |
| P4R1 | 2 | 0.095 | 1.015 | 0 |
| P4R2 | 2 | 0.715 | 1.145 | 0 |
| P5R1 | 3 | 0.335 | 1.255 | 1.605 |
| P5R2 | 2 | 0.975 | 1.795 | 0 |
| P6R1 | 3 | 0.195 | 1.165 | 1.475 |
| P6R2 | 1 | 0.405 | 0 | 0 |

TABLE 12

| | Arrest point number | Arrest point position 1 | Arrest point position 2 | Arrest point position 3 |
|---|---|---|---|---|
| P1R1 | 0 | 0 | 0 | 0 |
| P1R2 | 0 | 0 | 0 | 0 |
| P2R1 | 2 | 0.215 | 0.585 | 0 |
| P2R2 | 1 | 0.135 | 0 | 0 |
| P3R1 | 1 | 0.155 | 0 | 0 |
| P3R2 | 1 | 0.765 | 0 | 0 |
| P4R1 | 2 | 0.145 | 1.175 | 0 |
| P4R2 | 0 | 0 | 0 | 0 |
| P5R1 | 3 | 0.625 | 1.545 | 1.635 |
| P5R2 | 1 | 1.435 | 0 | 0 |
| P6R1 | 1 | 0.375 | 0 | 0 |
| P6R2 | 1 | 1.115 | 0 | 0 |

Figure 10:
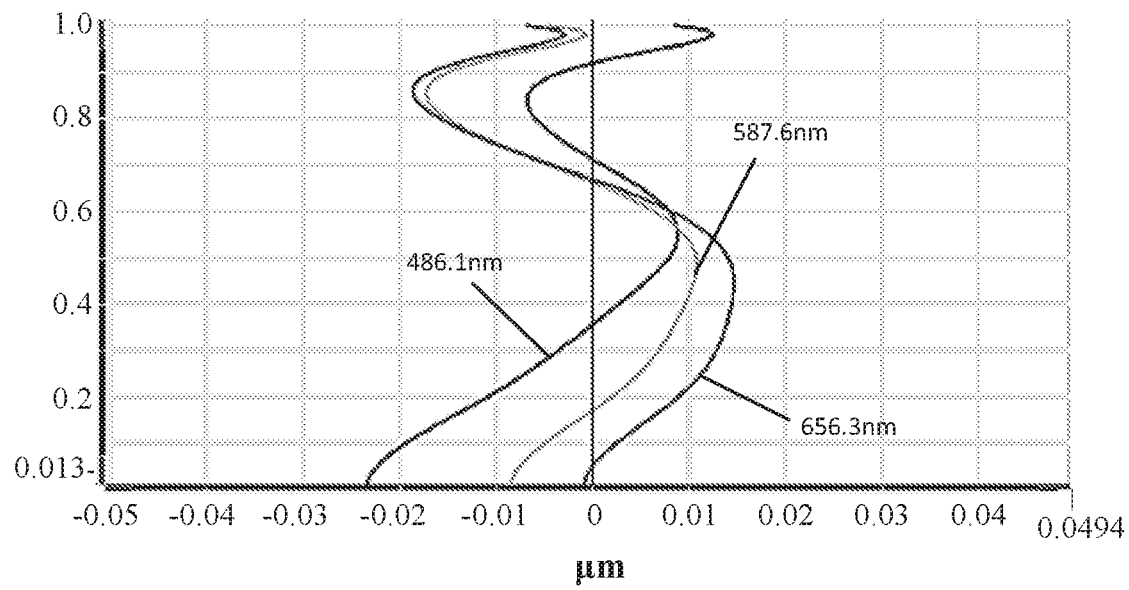
FIG. 10 is a schematic diagram of a longitudinal aberration of the camera optical lens shown in FIG. 9.
Figure 11:
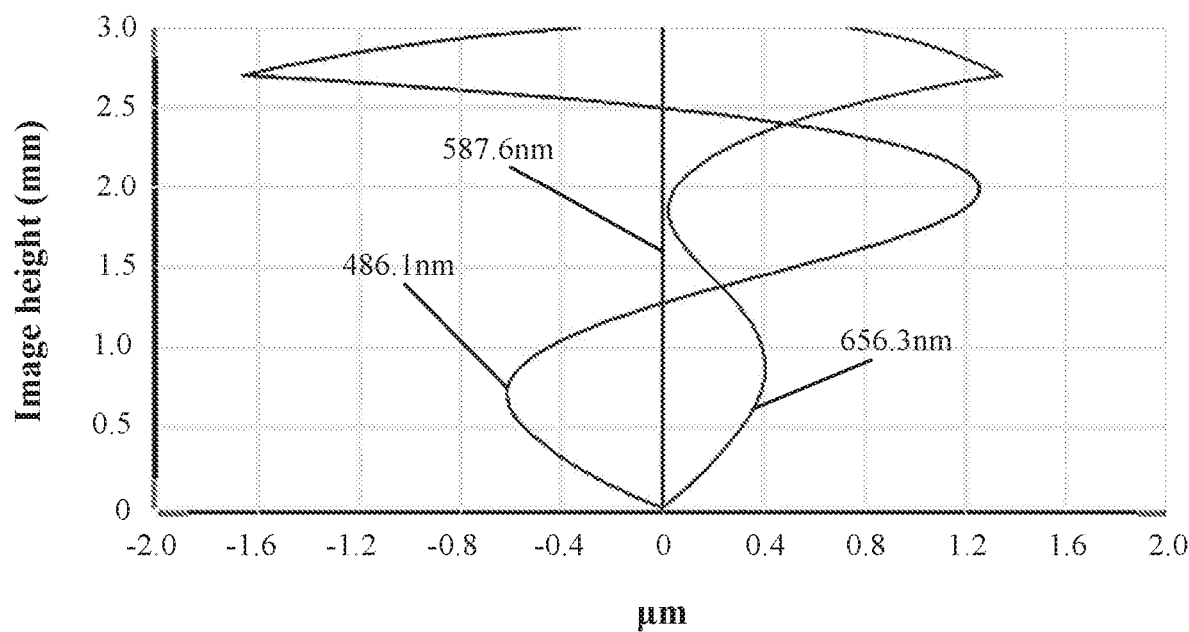
FIG. 11 is a schematic diagram of a lateral color of the camera optical lens shown in FIG. 9.
Figure 12:
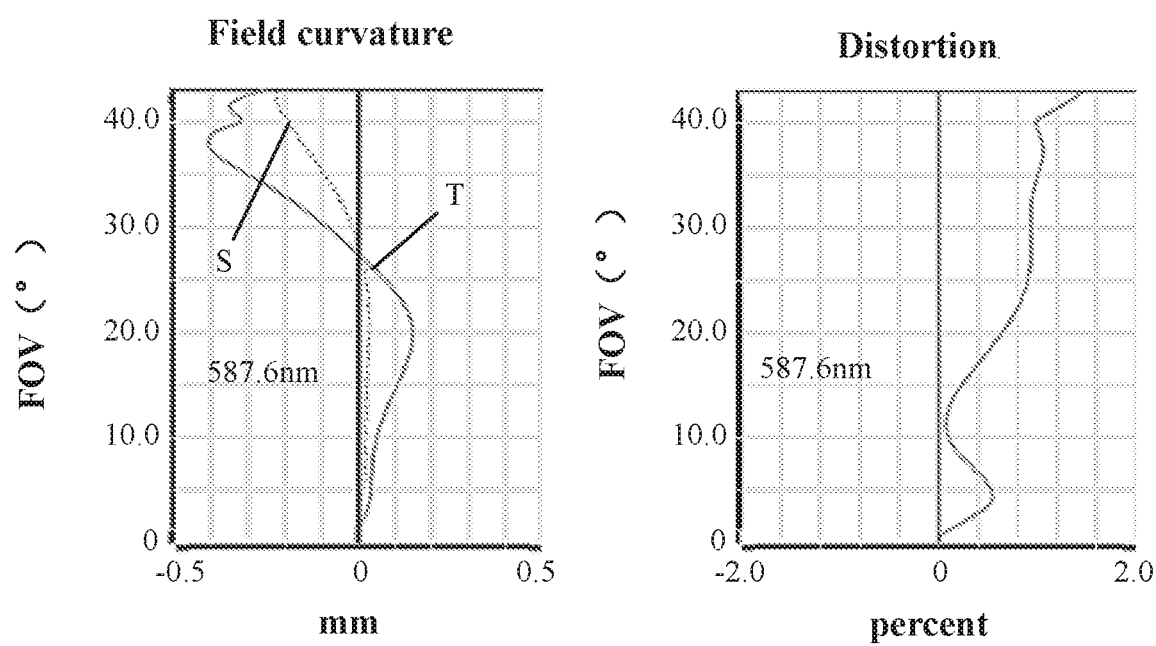
FIG. 12 is a schematic diagram of a field curvature and a distortion of the camera optical lens shown in FIG. 9.

FIG. 10 and FIG. 11 show schematic diagrams of a longitudinal aberration and a lateral color obtained when light with wavelengths of 486.1 nm, 587.6 nm, and 656.3 nm passes through the camera optical lens 30 in Embodiment 3. FIG. 12 shows schematic diagrams of a field curvature and a distortion obtained when light with a wavelength of 587.6 nm passes through the camera optical lens 30 in Embodiment 3.

The following Table 13 shows the values corresponding to the conditions in this embodiment. Obviously, this embodiment satisfies the various conditions.

In this embodiment, an entrance pupil diameter of the camera optical lens is 1.561 mm, an image height of 1.0H is 3.000 mm, an FOV (field of view) is 86.04°. Thus, the camera optical lens has a wide-angle and is ultra-thin. Its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f | 3.361 | 3.392 | 3.122 |
| f1 | 5.259 | 4.958 | 5.665 |
| f2 | 48.343 | 69.085 | 103.300 |
| f3 | −4.834 | −4.639 | −5.207 |
| f4 | 2.800 | 2.850 | 2.762 |
| f5 | 9.021 | 10.202 | 9.754 |

TABLE 13-continued

| Parameters and conditions | Embodiment 1 | Embodiment 2 | Embodiment 3 |
|---|---|---|---|
| f6 | −3.641 | −3.336 | −3.784 |
| f12 | 4.839 | 4.676 | 5.368 |
| FNO | 2.00 | 2.00 | 2.00 |
| f2/f3 | −10.00 | −14.89 | −19.84 |
| d1/d3 | 2.89 | 1.75 | 0.51 |

Persons of ordinary skill in the art can understand that, the above embodiments are specific examples for implementing the present disclosure, and during actual application, various changes may be made to forms and details of the examples without departing from the spirit and scope of the present disclosure.

What is claimed is:

1. A camera optical lens comprising, from an object side to an image side in sequence: a first lens, a second lens, a third lens, a fourth lens, a fifth lens and a sixth lens, the first lens has a positive refractive power, the second lens has a positive refractive power, the third lens has a negative refractive power, the fourth lens has a positive refractive power, the fifth lense has a positive refractive power, and the sixth lens has a negative refractive power, wherein an object-side surface of the fourth lens is concave in a paraxial region and an image-side surface of the fourth lens is convex in the paraxial region;
wherein the camera optical lens satisfies the following conditions:

$-20.00 \leq f2/f3 \leq -10.00$;

$0.50 \leq d1/d3 \leq 3.00$;

$0.42 \leq f4/f \leq 1.33$, $0.52 \leq (R7+R8)/(R7-R8) \leq 1.97$; and $0.04 \leq d7/TTL \leq 0.16$, Where
f denotes a focal length of the camera optical lens;
f2 denotes a focal length of the second lens;
f3 denotes a focal length of the third lens;
f4 denotes a focal length of the fourth lens;
R7 denotes a curvature of an object-side surface of the fourth lens;
R8 denotes a curvature of an image-side surface of the fourth lens;
d1 denotes an on-axis thickness of the first lens;
d3 denotes an on-axis thickness of the second lens,
d7 denotes an on-axis thickness of the fourth lens; and
TTL denotes a total optical length from the object-side surface of the first lens to an image surface of the camera optical lens along an optical axis.

2. The camera optical lens according to claim 1, further satisfying the following conditions:

$-19.92 \leq f2/f3 \leq -10.00$; and $0.51 \leq d1/d3 \leq 2.95$.

3. The camera optical lens according to claim 1, wherein an object-side surface of the first lens is convex in a paraxial region and an image-side surface of the first lens is concave in the paraxial region;
wherein the camera optical lens satisfies the following conditions:

$0.73 \leq f1/f \leq 2.72$;

$-5.72 \leq (R1+R2)/(R1-R2) \leq -1.78$; and $0.03 \leq d1/TTL \leq 0.18$;

where
f denotes a focal length of the camera optical lens;
f1 denotes a focal length of the first lens;
R1 denotes a curvature radius of an object-side surface of the first lens;
R2 denotes a curvature radius of an image-side surface of the first lens; and
TTL denotes a total optical length from the object-side surface of the first lens to an image surface of the camera optical lens along an optical axis.

4. The camera optical lens according to claim 3, further satisfying the following conditions:

$1.17 \leq f1/f \leq 2.18$;

$-3.58 \leq (R1+R2)/(R1-R2) \leq -2.22$; and $0.05 \leq d1/TTL \leq 0.15$.

5. The camera optical lens according to claim 1, wherein the camera optical lens satisfies the following conditions:

$7.19 \leq f2/f \leq 49.63$;

$-7.05 \leq (R3+R4)/(R3-R4) \leq 6.26$; and $0.02 \leq d3/TTL \leq 0.20$;

where
f denotes a focal length of the camera optical lens;
R3 denotes a curvature radius of an object-side surface of the second lens;
R4 denotes a curvature radius of an image-side surface of the second lens; and
TTL denotes a total optical length from the object-side surface of the first lens to an image surface of the camera optical lens along an optical axis.

6. The camera optical lens according to claim 5, further satisfying the following conditions:

$11.51 \leq f2/f \leq 39.71$;

$-4.41 \leq (R3+R4)/(R3-R4) \leq 5.01$; and $0.03 \leq d3/TTL \leq 0.16$.

7. The camera optical lens according to claim 1, wherein an image-side surface of the third lens is concave in a paraxial region;
wherein the camera optical lens satisfies the following conditions:

$-3.34 \leq f3/f \leq -0.91$;

$0.50 \leq (R5+R6)/(R5-R6) \leq 2.01$; and $0.05 \leq d5/TTL \leq 0.17$;

where
f denotes a focal length of the camera optical lens;
R5 denotes a curvature radius of an object-side surface of the third lens; and
R6 denotes a curvature radius of an image-side surface of the third lens;

d5 denotes an on-axis thickness of the third lens; and

TTL denotes a total optical length from the object-side surface of the first lens to an image surface of the camera optical lens along an optical axis.

8. The camera optical lens according to claim 7, further satisfying the following conditions:

$-2.08 \leq f3/f \leq -1.14$;

$0.80 \leq (R5+R6)/(R5-R6) \leq 1.61$; and $0.08 \leq d5/TTL \leq 0.14$.

9. The camera optical lens according to claim 1, further satisfying the following conditions:

$0.67 \leq f4/f \leq 1.06$;

$0.83 \leq (R7+R8)/(R7-R8) \leq 1.58$; and $0.07 \leq d7/TTL \leq 0.13$.

10. The camera optical lens according to claim 1, wherein an object-side surface of the fifth lens is convex in a paraxial region and an image-side surface of the fifth lens is convex in the paraxial region;

wherein the camera optical lens satisfies the following conditions:

$1.34 \leq f5/f \leq 4.69$;

$-0.73 \leq (R9+R10)/(R9-R10) \leq 0.13$; and $0.03 \leq d9/TTL \leq 0.09$;

where f denotes a focal length of the camera optical lens;

f5 denotes a focal length of the fifth lens;

R9 denotes a curvature radius of an object-side surface of the fifth lens;

R10 denotes a curvature radius of an image-side surface of the fifth lens;

d9 denotes an on-axis thickness of the fifth lens; and

TTL denotes a total optical length from the object-side surface of the first lens to an image surface of the camera optical lens along an optical axis.

11. The camera optical lens according to claim 10, further satisfying the following conditions:

$2.15 \leq f5/f \leq 3.75$;

$-0.46 \leq (R9+R10)/(R9-R10) \leq 0.10$; and $0.05 \leq d9/TTL \leq 0.08$.

12. The camera optical lens according to claim 1, wherein an object-side surface of the sixth lens is convex in a paraxial region and an image-side surface of the sixth lens is concave in the paraxial region;

wherein the camera optical lens satisfies the following conditions:

$-2.42 \leq f6/f \leq -0.66$;

$0.96 \leq (R11+R12)/(R11-R12) \leq 3.32$; and $0.04 \leq d11/TTL \leq 0.12$;

where f denotes a focal length of the camera optical lens;

f6 denotes a focal length of the sixth lens;

R11 denotes a curvature radius of an object-side surface of the sixth lens;

R12 denotes a curvature radius of an image-side surface of the sixth lens;

d11 denotes an on-axis thickness of the sixth lens; and

TTL denotes a total optical length from the object-side surface of the first lens to an image surface of the camera optical lens along an optical axis.

13. The camera optical lens according to claim 12, wherein further satisfying the following conditions:

$-1.52 \leq f6/f \leq -0.82$;

$1.54 \leq (R11+R12)/(R11-R12) \leq 2.66$; and $0.06 \leq d11/TTL \leq 0.10$.

14. The camera optical lens according to claim 1, wherein the camera optical lens satisfies the following condition:

$0.69 \leq f12/f \leq 2.58$;

where f12 denotes a combined focal length of the first lens and the second lens; and f denotes a focal length of the camera optical lens.

15. The camera optical lens according to claim 14, further satisfying the following condition:

$1.10 \leq f12/f \leq 2.06$.

16. The camera optical lens according to claim 1, wherein a total optical length TTL from an object-side surface of the first lens to an image surface of the camera optical lens along an optical axis is less than or equal to 5.16 mm.

17. The camera optical lens according to claim 16, wherein the total optical length TTL of the camera optical lens is less than or equal to 4.92 mm.

18. The camera optical lens according to claim 1, wherein an F number of the camera optical lens is less than or equal to 2.06.

19. The camera optical lens according to claim 18, wherein the F number of the camera optical lens is less than or equal to 2.02.

* * * * *